(12) United States Patent
Yamamura

(10) Patent No.: US 10,356,270 B2
(45) Date of Patent: Jul. 16, 2019

(54) LENS UNIT, LED HEAD, EXPOSURE DEVICE, AND IMAGE FORMATION APPARATUS

(71) Applicant: Oki Data Corporation, Tokyo (JP)

(72) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/624,748

(22) Filed: Jun. 16, 2017

(65) Prior Publication Data

US 2018/0007225 A1    Jan. 4, 2018

(30) Foreign Application Priority Data

Jun. 29, 2016  (JP) .................... 2016-129346

(51) Int. Cl.
```
G02B 3/00      (2006.01)
H04N 1/29      (2006.01)
H04N 1/024     (2006.01)
H04N 1/028     (2006.01)
G03G 15/043    (2006.01)
```
(52) U.S. Cl.
CPC ......... *H04N 1/02481* (2013.01); *G02B 3/005* (2013.01); *G02B 3/0037* (2013.01); *G02B 3/0062* (2013.01); *G02B 3/0068* (2013.01); *G02B 3/0075* (2013.01); *G03G 15/0435* (2013.01); *H04N 1/02865* (2013.01); *H04N 1/29* (2013.01); *H04N 2201/0091* (2013.01)

(58) Field of Classification Search
CPC ........... H04N 1/02481; H04N 1/02865; H04N 1/0288; G03G 15/04054
See application file for complete search history.

(56) References Cited

U.S. PATENT DOCUMENTS

| | | | |
|---|---|---|---|
| 8,780,417 B2 * | 7/2014 | Yamamura | H04N 1/10 358/474 |
| 8,922,894 B2 * | 12/2014 | Yamamura | G02B 3/005 359/621 |
| 2010/0177400 A1 * | 7/2010 | Yamamura | B41J 2/451 359/619 |

FOREIGN PATENT DOCUMENTS

JP        2013-015847 A        1/2013

* cited by examiner

*Primary Examiner* — Ryan D Walsh
(74) *Attorney, Agent, or Firm* — Metrolexis Law Group, PLLC

(57) ABSTRACT

A lens unit according to one or more embodiments includes a lens plate member including a plurality of lenses arranged in a first direction; and a light block member provided facing the lens plate member and including a plurality of opening portions arranged in the first direction, the opening portions being provided in one-to-one correspondence with the lenses. A first positioning portion is formed at a first position in first direction of each of the lens plate member and the light block member. The first positioning portion of the lens plate member and the first positioning portion of the light block member align with each other and continuously extend in a second direction along an optical axis direction of the lenses.

5 Claims, 23 Drawing Sheets

LENS UNIT, LED HEAD, EXPOSURE DEVICE, AND IMAGE FORMATION APPARATUS

CROSS REFERENCE TO RELATED APPLICATIONS

This application claims priority based on 35 USC 119 from prior Japanese Patent Application No. 2016-129346 filed on Jun. 29, 2016, entitled "LENS UNIT, LED HEAD, EXPOSURE DEVICE, AND IMAGE FORMATION APPARATUS", the entire contents of which are incorporated herein by reference.

BACKGROUND

1. Field

The present disclosure relates to a lens unit, an LED head, an exposure device, and an image formation apparatus.

2. Description of Related Art

In a related art, an optical system that forms an erected, original-sized image of an object in a line form using a lens array including arrayed microlenses is used as an optical system applied to, for example, a xerographic image formation apparatus that uses an LED head including arrays of light emitting diodes (LEDs), or a scanner device that forms an image of an original onto a light reception part having arrays of photosensitive elements (see, for example, Japanese Patent Application Publication No. 2013-015847).

SUMMARY

However, it is difficult to assemble the components of the lens array accurately.

An embodiment of the invention aims to enable components of a lens array to be assembled accurately.

An aspect of the inventions is a lens unit according to one or more embodiments includes a lens plate member including a plurality of lenses arranged in a first direction; and a light block member provided facing the lens plate member and including a plurality of opening portions arranged in the first direction, the opening portions being provided in one-to-one correspondence with the lenses. A first positioning portion is formed at a first position in first direction of each of the lens plate member and the light block member. The first positioning portion of the lens plate member and the first positioning portion of the light block member align with each other and continuously extend in a second direction along an optical axis direction of the lenses.

According to the above aspect, the components of a lens array can be assembled accurately.

DETAILED DESCRIPTION OF EMBODIMENTS

Figure 1:
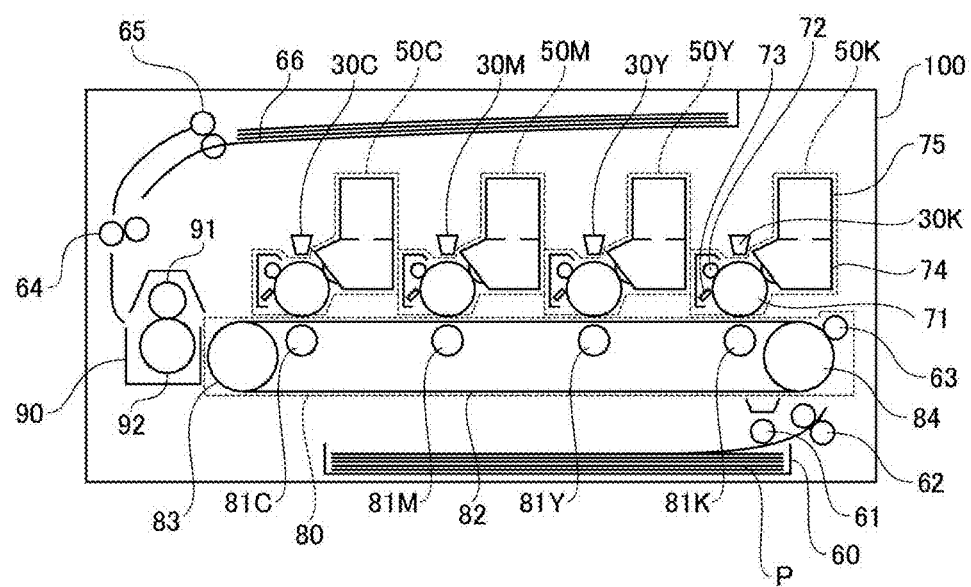
FIG. 1 is a schematic diagram of a printer according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

It should be noted that the invention is not limited to the matters described below, and can be appropriately modified without departing from the gist of the invention.

First Embodiment

First, a description is given of a printer as an image formation apparatus. The printer described in an embodiment is a color xerographic image formation apparatus capable of forming a color image on a print medium based on image data using toners made of resin containing pigments as color materials. The configuration of printer 100 having such capability is described using the schematic diagram in FIG. 1.

Printer 100 is provided with image formation units 70K (black), 70Y (yellow), 70M (magenta), and 70C (cyan), transfer unit 80, and fixation unit 90, which are arranged along a medium conveyance path formed substantially in a letter-S shape, starting from media cassette 60, passing through conveyance rollers 62 and 63 and discharge rollers 64 and 65, and ending at discharged media stacker 66.

Media cassette 60 houses stacked sheets P as print media, and is detachably attached to a lower portion of printer 100. Feed roller 61 disposed above media cassette 60 picks up an uppermost one of sheets P housed in media cassette 60 and feeds it to the medium conveyance path.

Conveyance rollers 62 and 63 convey sheet P fed by feed roller 61 to transfer belt 82 while correcting the skew of sheet P.

Discharge rollers 64 and 65 grip and convey sheet P having passed fixation unit 90 and discharge sheet P to discharged media stacker 66 formed using the outer casing of printer 100.

Printer 100 according to this embodiment employs xerography as described earlier, and includes inside printer 100 image formation units 70K, 70Y, 70M, and 70C respectively corresponding to a black (K) toner, a yellow (Y) toner, a magenta (M) toner, and a cyan (C) toner. The image formation units 70K, 70Y, 70M, and 70C have the same configuration, with their only differences being the colors of the toners housed therein. Thus, only the components of image formation unit 70K are denoted by reference signs, and the alphabetical letters identifying image formation units 70K, 70Y, 70M, and 70C are omitted in the following description.

Image formation unit 70 includes photosensitive drum 71 as an electrostatic latent image carrier, charge roller 72 that uniformly charges the surface of photosensitive drum 71, cleaner blade 73 that removes toner left on the surface of photosensitive drum 71 having passed transfer roller 81 to be described later, development device 74 that develops the electrostatic latent image formed by LED head 50 to be described later on the surface of photosensitive drum 71 by attaching toner to the electrostatic latent image, forming a toner image, and toner cartridge 75 that supplies toner to development device 74.

Photosensitive drum 71 is formed by a conductive support and a photoconductive layer, and is, for example, an organic photosensitive device having charge generation layers and charge transportation layers alternately stacked as the photoconductive layer on a metallic shaft made of aluminum or the like as the conductive support. Photosensitive drum 71, while rotating in a predetermined direction, forms an electrostatic latent image based on light beams emitted by LED head 50.

Charge roller 72 is formed by, for example, a metallic shaft made of stainless steel or the like and semiconducting epichlorohydrin rubber. Charge roller 72 is in contact with photosensitive drum 71 with a predetermined pressure, and charges the surface of photosensitive drum 71 uniformly based on a charge bias applied by a high voltage source (not shown).

Cleaner blade 73 is, for example, a member made of urethane rubber, and an edge thereof is disposed at such a position as to be in contact with the surface of photosensitive drum 71. Cleaner blade 73 removes residual toner on the surface of photosensitive drum 71 by scraping the surface of photosensitive drum 71 clean.

Although not shown, components of development device 74 include at least a development roller (not shown) that comes into close contact with photosensitive drum 71 and attaches toner to an electrostatic latent image formed on the surface of photosensitive drum 71, a supply roller that supplies the toner to the development roller, and a development blade that is in contact with the development roller and regulates the film thickness of the toner supplied by the supply roller.

Toner cartridge 75 is a box-shaped container that houses toner of a corresponding color, and is configured to be attachable to and detachable from image formation unit 70.

Transfer unit 80 includes transfer rollers 81K, 81Y, 81M, and 81C that are in pressure contact with photosensitive drums 71 of image formation units 70K, 70Y, 70M, and 70C, respectively, with transfer belt 82 interposed therebetween, transfer belt 82, driver roller 83, and tension roller 84.

Transfer rollers 81K, 81Y, 81M, and 81C are, for example, made of conductive rubber, and transfers the toner image formed on the surface of photosensitive drum 71 onto sheet P based on an application voltage applied by the high voltage source (not shown).

Transfer belt 82 is an endless belt member that conveys sheet P while electrostatically attracting sheet P, and is tensioned around driver roller 83, which is rotated by driving force transmitted from a driver part (not shown), and tension roller 84, which forms a pair with driver roller 83.

Fixation unit 90 is provided on the medium conveyance path downstream of image formation units 70K, 70Y, 70M, and 70C, and includes components such as heat roller 91, backup roller 92, and a thermistor (not shown). Heat roller 91 is formed by coating a hollow, cylindrical metallic core made of aluminum or the like with a heat-resistant elastic layer made of silicone rubber and then placing a tetrafluoroethylene-perfluoroalkyl vinyl ether copolymer (PFA) tube over the layer-coated metal core. A heater such as a halogen lamp is provided inside the metallic core. Backup roller 92 is formed by, for example, coating a metallic core made of aluminum or the like with a heat-resistant elastic layer made of silicone rubber and then placing a PFA tube over the layer-coated metallic core, and is disposed at such a position that a pressure contact area may be formed between backup roller 92 and heat roller 91. The thermistor is a detector of the surface temperature of heat roller 91, and is provided near heat roller 91 in a contactless manner. The surface temperature of heat roller 91 is maintained at a predetermined temperature by the heater controlled based on the surface temperature of heat roller 91 detected by the thermistor. When sheet P having toner images formed by image formation units 70K, 70Y, 70M, and 70C passes the pressure contact area formed between backup roller 92 and heat roller 91 maintained at the predetermined temperature, heat and pressure is applied to the toner on sheet P, fusing the toner and fixing the toner images.

Printer 100 also includes members not depicted in FIG. 1, such as: a print controller having a microprocessor, a read-only memory (ROM), a random access memory (RAM), an input/output port, a timer, and the like; an interface controller that receives print data and a control command and performs a print operation by controlling the overall sequence of printer 100; a reception memory that temporarily stores print data inputted via the interface controller; an image data edit memory that receives print data stored in the reception memory and stores image data formed by performing edit processing on the print data; a display unit that includes a display device such as a liquid crystal display (LCD) for display of the status of printer 100; an operation part that includes an input device such as a touch panel to receive instructions from a user; various sensors for monitoring the operation status of printer 100, such as a sheet position detection sensor, a temperature/humidity sensor, and a concentration sensor; an exposure-device drive controller that sends the image data stored in the image data edit memory to LED heads 50K, 50Y, 50M, and 50C and controls the driving of LED heads 50K, 50Y, 50M, and 50C; a temperature controller that controls the temperature of fixation unit 90; a sheet conveyance motor controller that controls drive motors for rotating the rollers that convey sheet P; a drive controller that controls driving motors that rotate various rollers such as the photosensitive drums; and/or a high voltage source that applies voltage to the rollers.

Figure 2:
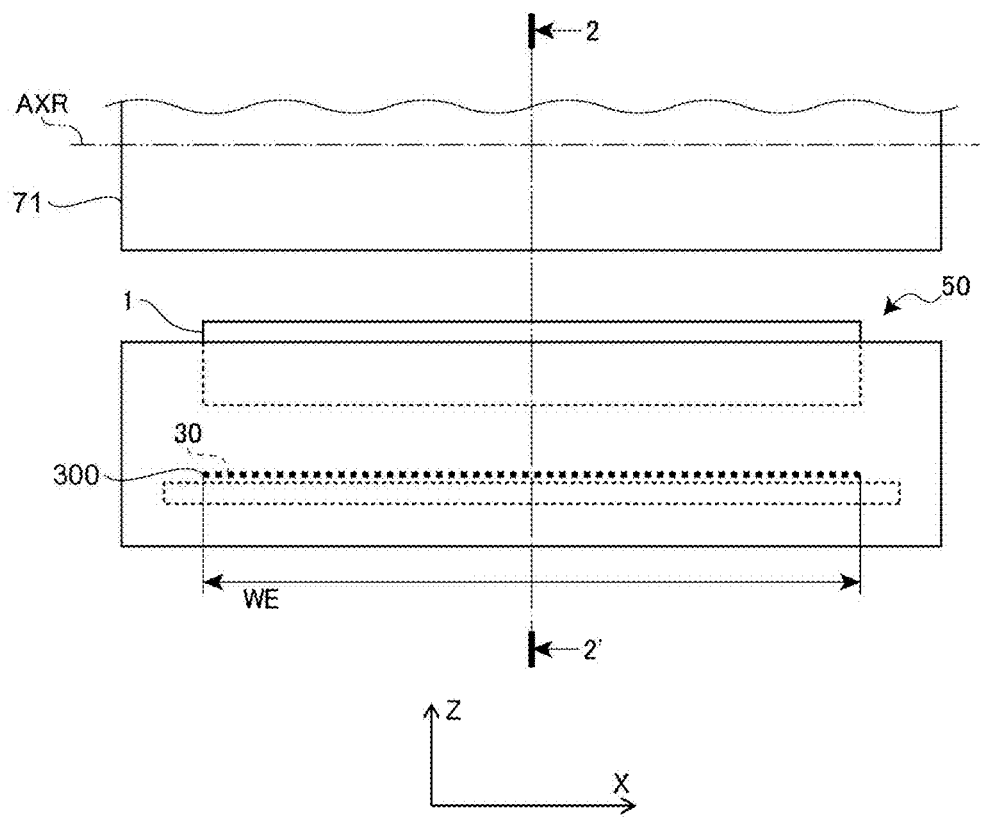
FIG. 2 is a schematic diagram of an LED head as an exposure device according to an embodiment.
Figure 3:
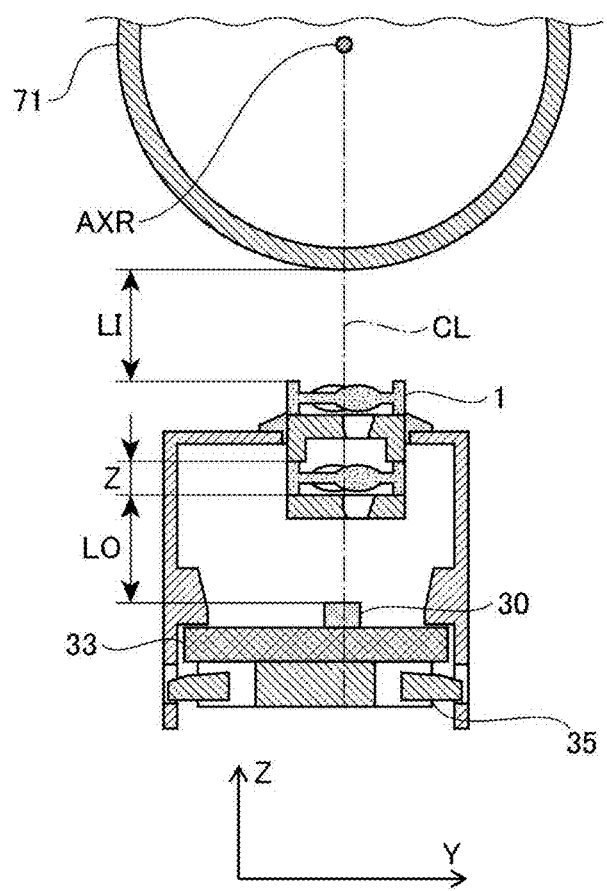
FIG. 3 is a diagram illustrating the sectional structure of the LED head.
Figure 4:
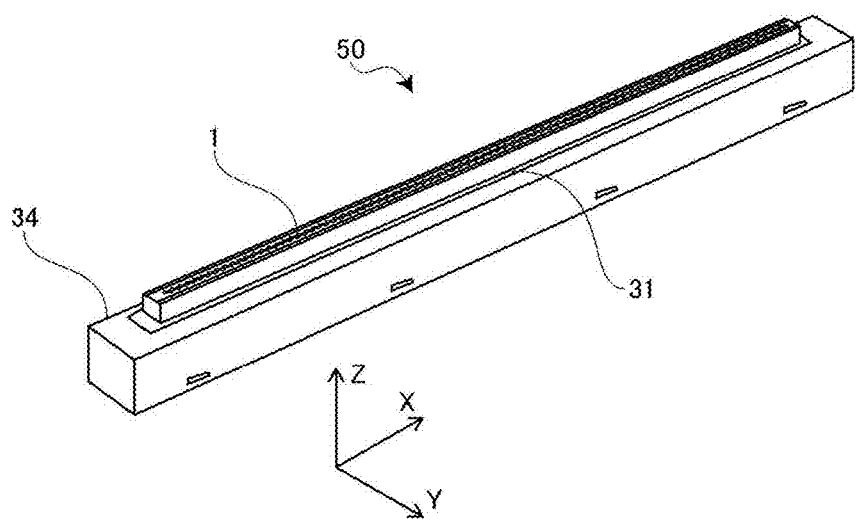
FIG. 4 is a perspective view illustrating the external structure of the LED head.

As described earlier, LED heads 50K, 50Y, 50M, and 50C as exposure devices form electrostatic latent images by emitting light beams based on image data to the surfaces of photosensitive drums 71 of image formation units 70K, 70Y, 70M, and 70C, respectively. LED heads 50K, 50Y, 50M, and 50C are disposed at positions such that light beams emitted therefrom are focused onto the surfaces of their respective photosensitive drums 71. With reference to FIGS. 2, 3, and 4, a detailed description is given of the configuration of LED heads 50K, 50Y, 50M, and 50C. Since LED heads 50K, 50Y, 50M, and 50C all have the same configuration, the alphabetical letters identifying LED heads 50K, 50Y, 50M, and 50C are omitted in the following description, as they are in the above description of the image formation units.

FIG. 2 is a schematic diagram of LED head 50 as an exposure device according to an embodiment. LED head 50 has lens array 1, which is an array of lens elements that form an image of an object and extends in the direction denoted by arrow X in FIG. 2 (the horizontal direction in FIG. 2). LED array 300 is an array of LED elements 30 arranged on a substantially straight line. The size of LED array 300 measured in the arrangement direction of LED elements 30 is denoted by WE. Lens array 1 is a long member extending in the arrow-X direction in FIG. 2 as described earlier, and is disposed in such a manner that the longitudinal direction thereof may be parallel to LED array 300. AXR in FIG. 2 denotes the rotation axis of photosensitive drum 71. Photosensitive drum 71 is disposed in such a manner that a rotation axis AXR thereof may be parallel to the longitudinal direction of LED array 300 and lens array 1.

FIG. 3 is a diagram illustrating the sectional structure of LED head 50, and is a sectional view taken along straight line 2-2' in FIG. 2. The direction in which the lens surfaces forming lens array 1 are arranged extends from the front side to the back side of FIG. 3, with the optical axis direction of each lens surface extending in the Z direction (vertical direction) in FIG. 3. When the center of lens array 1 in the Y direction in FIG. 3 is CL, LED elements 30 and the rotation axis AXR of photosensitive drum 71 are disposed on a straight line extrapolated from CL. LED elements 30 are mounted on circuit board 30, which is supported by base 35. Z denotes the size of lens array 1 measured in the Z direction in FIG. 3. The surface distance between LED elements 30 and each lens surface of lens array 1 is set to L0, and the surface distance between each lens surface of lens array 1 to the surface of photosensitive drum 71 is set to L1. L0 and L1 are equal (L0=L1).

FIG. 4 is a perspective view of LED head 50, illustrating its external structure. As already described, LED head 50 has lens array 1. Lens array 1 is fixed in LED head 50 by holder 34 in such a manner that leaving or entering light beams may be parallel to the Z direction (vertical direction) in FIG. 4. Seal 31 is a seal member that fills a gap between holder 34 and lens array 1.

In this embodiment, the resolution of LED head 50 is 1,200 dpi. Thus, 1,200 LED elements 30 are arranged per inch in LED array 300, with an interval of 0.21167 mm. The center value of the wavelength of light emitted by LED elements 30 is 770 nm.

Figure 5:
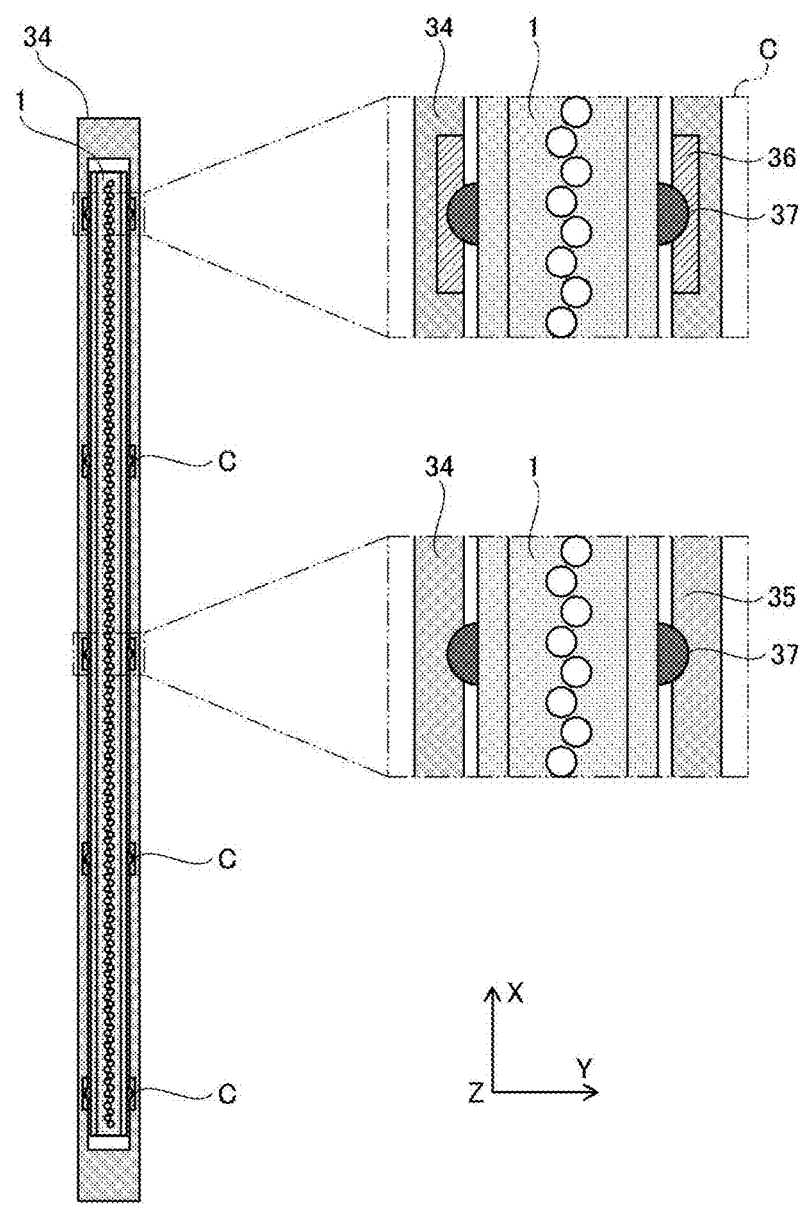
FIG. 5 is a diagram illustrating a lens array fixed to a holder.

With reference to FIG. 5, a description is given of how lens array 1 is fixed to holder 34. FIG. 5 is a plan view of lens array 1 fixed to holder 34. FIG. 5 omits seal 31 depicted in FIG. 4.

Region C in FIG. 5 has slide portions 36, each formed by application of a lubricant to holder 34. Lens array 1 is fixed to holder 34 by adhesive 37 at fixation portion 35. Region C with slide portions 36 is formed at four locations, excluding the center portion in FIG. 5. With such a structure, lens array 1 is fixed to holder 34 at its center portion so as not to be able to move omnidirectionally, but the end portions of lens array 1 are allowed to move by slide portions 36 in the X direction (vertical direction) in FIG. 5, which is the longitudinal direction of lens array 1. Adhesive 37 restricts movement of lens array 1 in the Y direction and the Z direction in FIG. 5, the Z direction being perpendicular to both the X direction and the Y direction. With the structure described above, even if the lens surfaces on lens array 1 change in position in the X direction (vertical direction) in FIG. 5 with changes in temperature, lens array 1 and holder 34 do not warp due to the difference in expansion/contraction amount between lens array 1 and holder 34.

Figure 6:
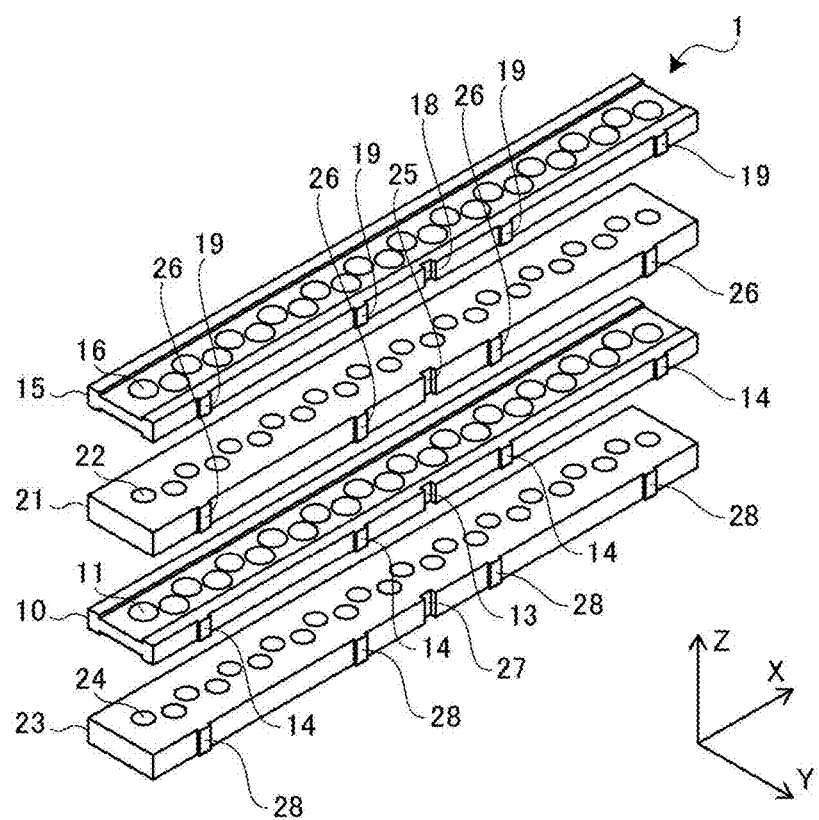
FIG. 6 is an exploded perspective view illustrating the configuration of the lens array.

Next, the configuration of lens array 1 is described with reference to FIG. 6. FIG. 6 is an exploded perspective view of lens array 1. In lens array 1, first lens plate 10, which forms an inverted, minified image based on light emitted by LED elements 30, is oriented so that the optical axis of each lens surface 11 of the first lens plate 10 extends in the Z direction (vertical direction) in FIG. 6. Light shield plate 21 is provided between first lens plate 10 and second lens plate 15, which inverts and magnifies the inverted, minified image formed by first lens plate 10 to form an inverted, magnified image of the inverted, minified image. Mask 23 is provided between LED elements 30 and first lens plate 10. First lens plate 10 has two arrays of lens surfaces 11, which are formed on one sides of respective lenses. Second lens plate 15 has two arrays of lens surfaces 16, which are formed on one sides of the respective lenses.

Light shield plate 21 has two arrays of opening portions 22, and mask 23 has two arrays of opening portions 24. Opening portions 22 and opening portions 24 are arranged at substantially the same intervals so that the optical axes of lens surfaces 11 and 16 may align with each other.

First lens plate 10 has X positioning portion 13 (first positioning portion) formed at a location which is substantially the center of a longitudinal side surface thereof, and further has Y positioning portions 14 (second positioning portions) formed on the same longitudinal side surface, at locations spaced apart at predetermined intervals. Y positioning portions 14 are formed on one of the end portions of first lens plate 10 facing in the Y direction in FIG. 6, which is orthogonal to both the longitudinal direction of first lens plate 10 and the optical axis direction of each lens surface 11. Similarly, second lens plate 15 has X positioning portion 18 (first positioning portion) formed at a location which is substantially the center of a longitudinal side surface thereof, and further has Y positioning portions 19 (second positioning portions) formed on the same longitudinal side surface, at locations spaced apart at predetermined intervals. Y positioning portions 19 are formed on one of the end portions of second lens plate 15 facing in the Y direction in FIG. 6, which is orthogonal to both the longitudinal direction of second lens plate 15 and the optical axis direction of each lens surface 16.

Light shield plate 21 has X positioning portion 25, serving as a first position portion, formed at a location which is substantially the center of a longitudinal side surface thereof, and further has Y positioning portions 26, serving as a second position portion, formed on the same longitudinal side surface, at locations spaced apart at predetermined intervals. Y positioning portions 26 are formed on one of the end portions of light shield plate 21 facing in the Y direction in FIG. 6, which is orthogonal to both the longitudinal direction of light shield plate 21 and the axis of each opening portion 22.

Mask 23 has X positioning portion 27, serving as a first position portion, formed at a location which is substantially the center of a longitudinal side surface thereof, and further has Y positioning portions 28, serving as a first position portion, formed on the same longitudinal side surface, at locations spaced apart at predetermined intervals. Y positioning portions 28 are formed on one of the end portions of mask 23 facing in the Y direction in FIG. 6, which is orthogonal to both the longitudinal direction of mask 23 and the axis of each opening portion 24.

First lens plate 10 and second lens plate 15 are each made of a material that transmits light beams emitted by LED elements 30, while light shield plate 21 and mask 23 are each made of a material that shields light beams emitted from LED elements 30.

Figure 7:
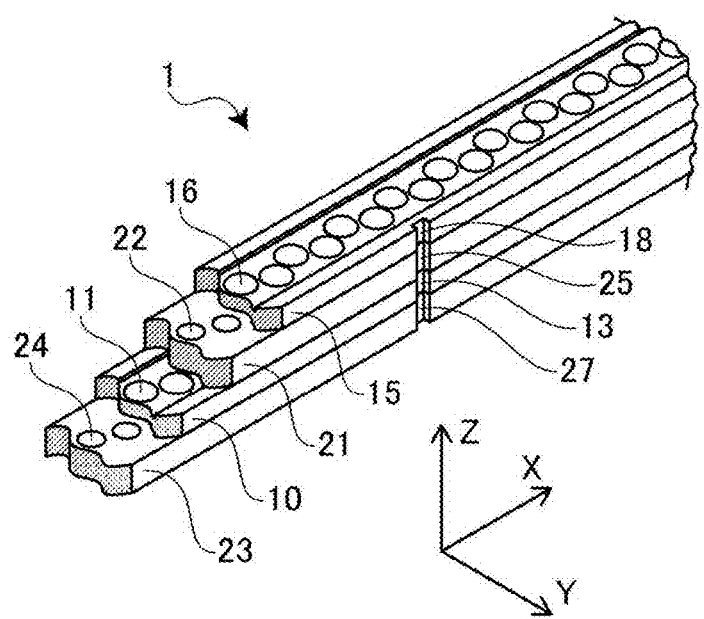
FIG. 7 is a diagram illustrating X positioning portions.

Next, using FIG. 7, a description is given of the X positioning portions depicted in FIG. 6. As in the example illustrated in FIG. 6, lens array 1 is configured so that the optical axis of each lens surface in first lens plate 10 and second lens plate 15 may extend in the Z direction (vertical direction) in FIG. 7. In lens array 1, mask 23, first lens plate 10, light shield plate 21, and second lens plate 15 are stacked in this order from down to up. In this state, X positioning portion 27 of mask 23, X positioning portion 13 of first lens plate 10, X positioning portion 25 of light shield plate 21, and X positioning portion 18 of second lens plate 15 substantially coincide with each other in their longitudinal positions in lens array 1. X positioning portions 27, 13, 25, and 18 align with one another continuously in the optical axis direction of each lens surface 11 and each lens surface 16.

Figure 8:
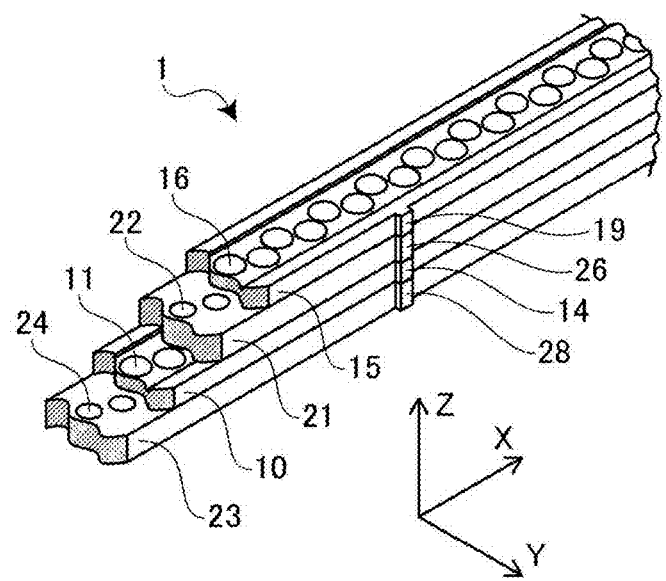
FIG. 8 is a diagram illustrating Y positioning portions.

Next, using FIG. 8, a description is given of the Y positioning portions depicted in FIG. 6. As in the examples illustrated in FIGS. 6 and 7, lens array 1 is configured so that the optical axis of each lens surface in first lens plate 10 and second lens plate 15 may extend in the Z direction (vertical direction) in FIG. 8. In lens array 1, mask 23, first lens plate 10, light shield plate 21, and second lens plate 15 are stacked in this order from down to up. In this state, Y positioning portions 28 of mask 23, Y positioning portions 14 of first lens plate 10, Y positioning portions 26 of light shield plate 21, and Y positioning portions 19 of second lens plate 15 substantially coincide with each other in their longitudinal positions in lens array 1, respectively. Corresponding Y positioning portions 28, 14, 26, and 19 align with one another in the optical axis direction of each lens surface 11 and each lens surface 16. Y positioning portions 28, 14, 26, and 19 substantially coincide with each other in their positions in the Y direction in FIG. 8, which is orthogonal to both the longitudinal direction of lens array 1 and the optical axis direction of each lens surface 11 and each lens surface 16.

Figure 9:
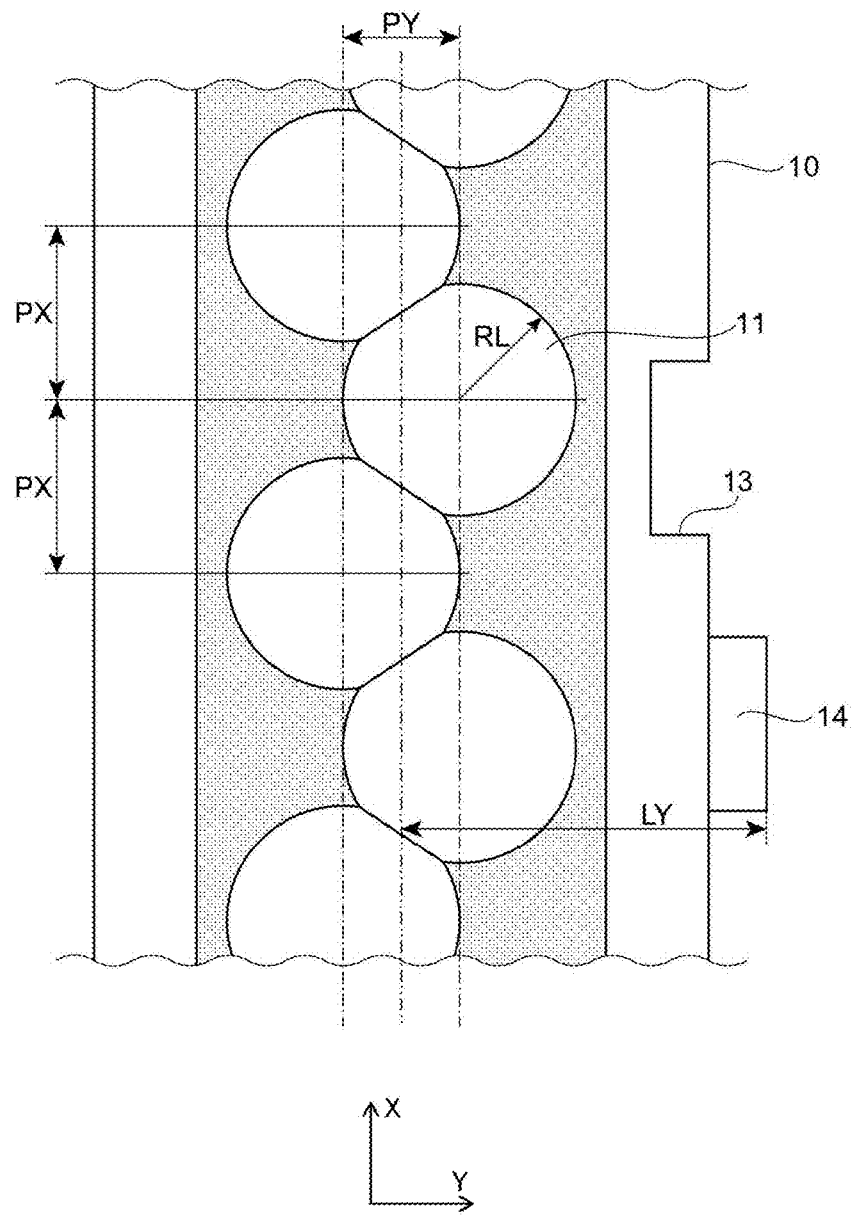
FIG. 9 is a diagram illustrating the shape of a first lens plate and a second lens plate.

Next, using FIG. 9, the shapes of first lens plate 10 and second lens plate 15 are described. Since first lens plate 10 and second lens plate 15 have substantially the same shape, only the shape of first lens plate 10 is described herein. The following description assumes that the vertical direction (the X direction) in FIG. 9 is the longitudinal direction of first lens plate 10.

As described earlier, first lens plate 10 has two arrays of lens surfaces 11, which are formed on one sides of the respective lenses. When PX is the array interval between adjacent lens surfaces 11, the array interval in one array of lens surfaces 11 is 2×PX. PY denotes the array interval between adjacent lens surface 11 in the horizontal direction (the Y direction) in FIG. 9. Y positioning portion 14 is formed at a position away from the two lens arrays by distance LY. First lens plate 10 is made of a material that transmits light beams emitted from LED elements 30, and lens surfaces 11, X positioning portion 13, and Y positioning portions 14 forming first lens plate 10 are formed integrally.

Figure 10:
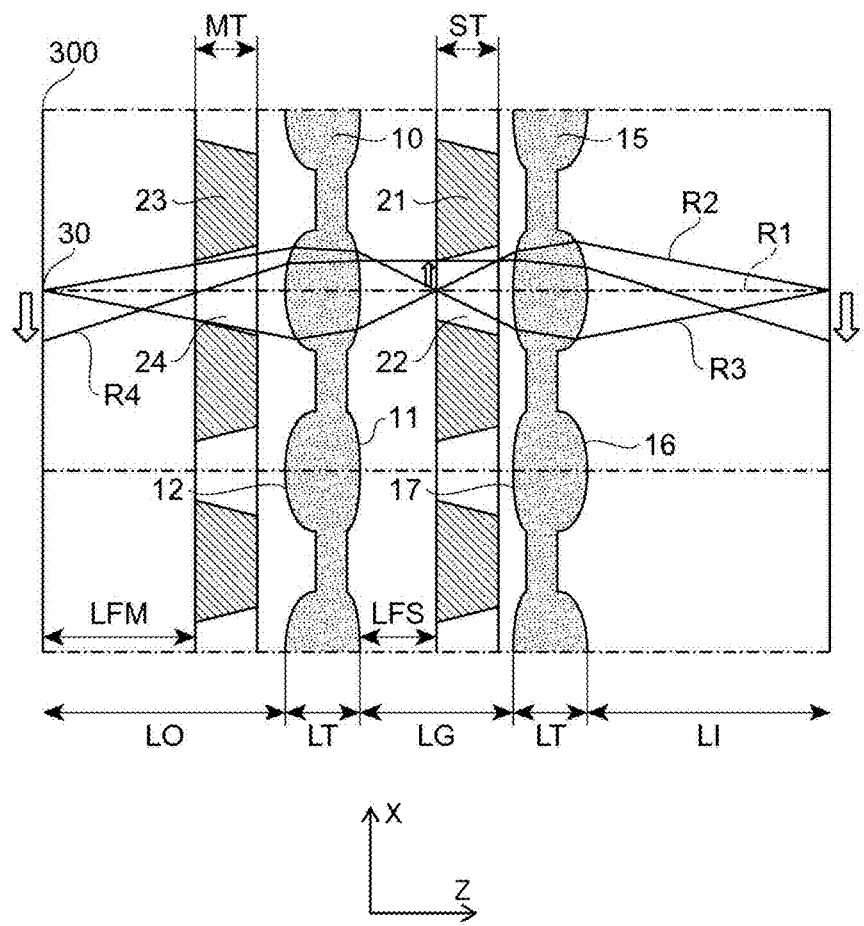
FIG. 10 is a sectional view of the lens array in the LED head.

FIG. 10 is a sectional view of lens array 1 of LED head 50. Lens array 1 is oriented so that its longitudinal direction may extend in the X direction (vertical direction) in FIG. 10. LED array 300 is disposed on the left of FIG. 10, and an image is formed on the right of FIG. 10. Mask 23 and light shield plate 21 are light shield members that shield light other than image-formation light beams from LED array 300, such as stray light and flare light. Opening portions 24 are openings formed in mask 23, and opening portions 22 are openings formed in light shield plate 21. Opening portions 24, lens surfaces 11 (12), opening portions 22, and lens surfaces 16 (17) respectively coincide with each other in position in the X direction and the Y direction in FIG. 10.

In this embodiment, the distance from LED array 300 to each lens surface 12, which is a surface opposing lens surface 11, is set to LO, the surface gap between each lens surface 12 (16) and corresponding lens surface 11 (17) is set to LT, the surface gap between each lens surface 11 and corresponding lens surface 17, which is a surface opposing lens surface 16, is set to LG, and the surface gap between each lens surface 16 to an image formation surface is set to LI. In addition, the surface gap between LED array 300 and mask 23 is set LFM, the surface gap between lens surface 11 and light shield plate 21 is set to LFS, the thickness of mask 23 is set to MT, and the thickness of light shield plate 21 is set to ST.

Figure 11:
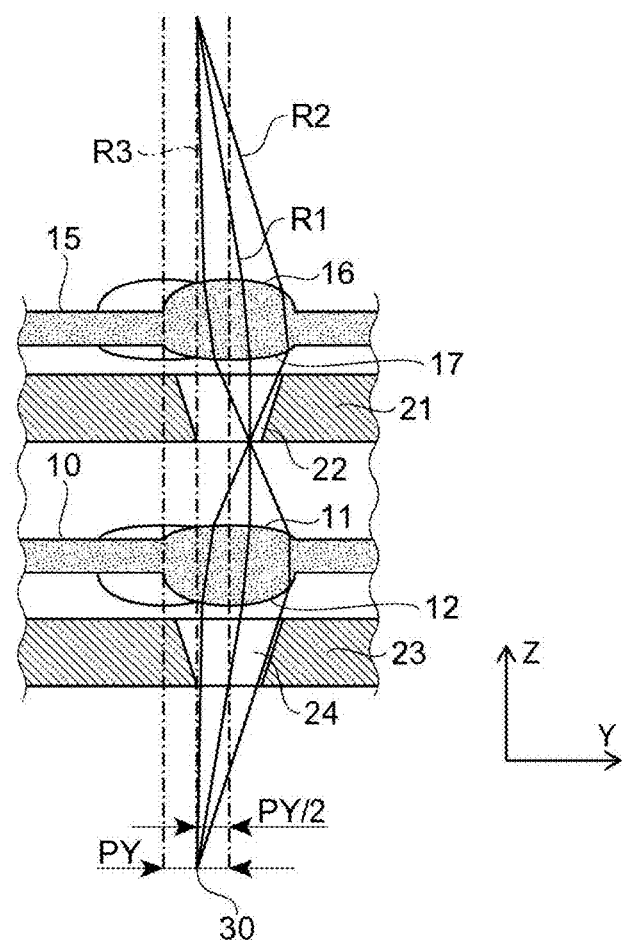
FIG. 11 is a sectional view of the lens array in the LED head.

FIG. 11 is a sectional view of lens array 1 of LED head 50. In a description herein, the optical axes of lens surfaces 11, 12, 16, and 17 extend in the Z direction (vertical direction) in FIG. 11. LED array 300 is disposed below lens array 1 in FIG. 11, and an image is formed above lens array 1 in FIG. 11. In FIG. 11, the optical axis of lens surfaces 11, 12, 16, and 17 is located PY/2 off the optical axis of corresponding LED element 30 in LED array 300 in the Y direction in FIG. 11. Opening portion 24 and opening portion 22 substantially coincide with the optical axis of corresponding lens surfaces 11, 12, 16, and 17 in position in the Y direction in FIG. 11.

Figure 12:
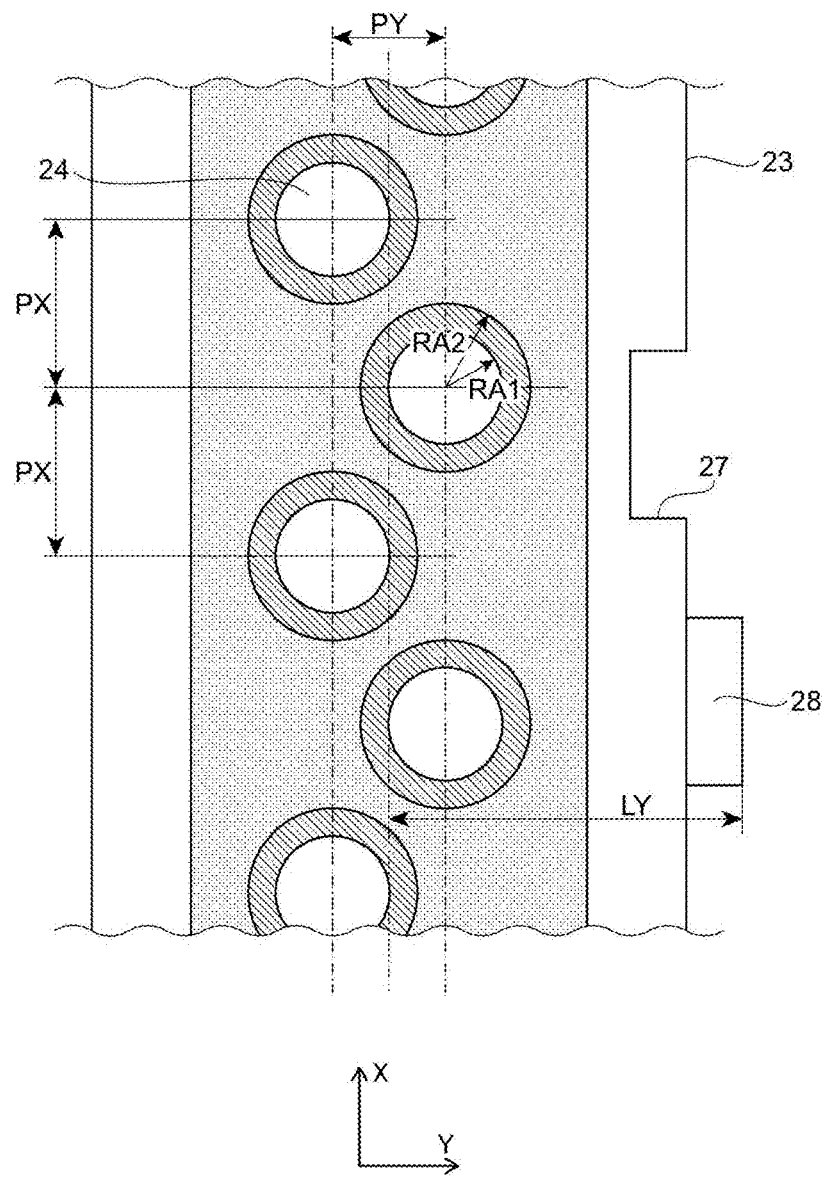
FIG. 12 is a diagram illustrating the shape of a mask.

Next, the shape of mask 23 is described using FIG. 12. The following description assumes that the X direction (vertical direction) in FIG. 12 extends in the longitudinal direction of mask 23. FIG. 12 depicts the surface of mask 23 that faces first lens plate 10, illustrating the shape of mask 23 as viewed from the first lens plate 10 side. As described earlier, mask 23 has two arrays of opening portions 24. When PX is the array interval between adjacent opening portions 24, the array interval in one array is 2×PX. PY denotes the array interval between adjacent opening portions 24 in the Y direction (horizontal direction) in FIG. 12. Opening portions 24 are circular. The opening diameter of each opening portion 24 is set to RA1 on the surface facing LED array 300 and to RA2 on the surface facing first lens plate 10. Opening diameter RA1 is smaller than opening diameter RA2. Y positioning portion 28 is formed at a position which is LY away from the midpoint of the two arrays of opening portions 24. Mask 23 is made of a material that shields light emitted from LED elements 30. Opening portions 24, X positioning portion 27, and Y positioning portions 28 forming mask 23 are formed integrally.

Figure 13:
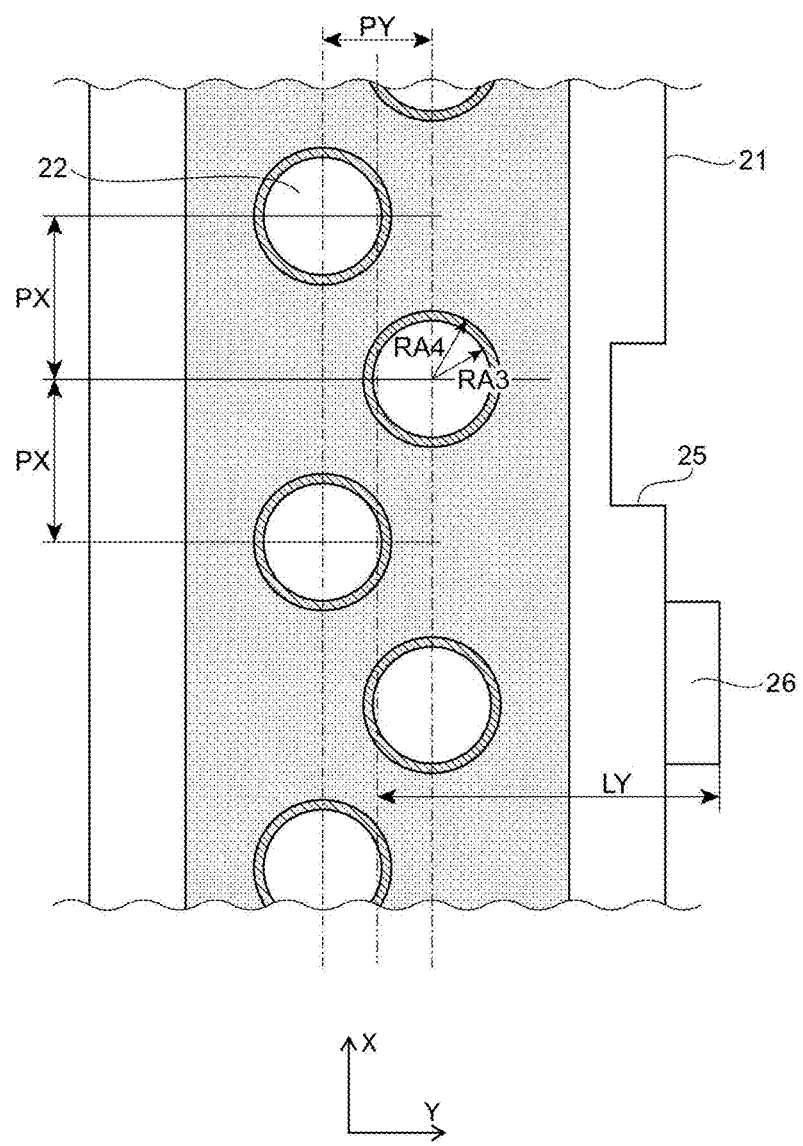
FIG. 13 is a diagram illustrating the shape of a light block plate.

Next, the shape of light shield plate 21 is described using FIG. 13. The following description assumes that the X direction (vertical direction) in FIG. 13 extends in the longitudinal direction of light shield plate 21. FIG. 13 depicts the surface of light shield plate 21 that faces first lens plate 10, illustrating the shape of light shield plate 21 as viewed from the first lens plate 10 side. As described earlier, light shield plate 21 has two arrays of opening portions 22. When PX is the array interval between adjacent opening portions 22, the array interval in one array is 2×PX. PY denotes the array interval between adjacent opening portions 22 in the Y direction (horizontal direction) in FIG. 13. Opening portions 22 are circular. The opening diameter of each opening portion 22 is set to RA3 on the surface facing LED array 300 and to RA4 on the surface facing second lens plate 15. Opening diameter RA3 is smaller than opening diameter RA4. Y positioning portion 26 is formed at a position which is LY away from the midpoint of the two arrays of opening portions 22. Light shield plate 21 is made of a material that shields light emitted from LED elements 30, and opening portions 22, X positioning portion 25, and Y positioning portions 26 forming light shield plate 21 are formed integrally.

Next, a description is given of an image formation process performed by printer 100 including LED head 50 described above.

First, once print data is inputted to printer 100, image data is generated based on the print data, and then printer 100 starts an image formation process. To start the image formation process, sheets P housed in media cassette 60 is fed to the medium conveyance path one at a time by document feed roller 61 rotating, driven by the drive motor (not shown). Then, sheet P is conveyed, by conveyance rollers 62 and 63, to image formation unit 70 along the medium conveyance path, while being corrected for its skew. The following image formation process starts at a predetermined timing before sheet P is conveyed to image formation unit 70.

When image data is generated for printer 100, photosensitive drum 71 rotates in a predetermined direction at a certain circumferential speed in FIG. 1, driven by a force transmitted from the driver part (not shown). Then, charge roller 72 in contact with the surface of photosensitive drum 71 applies a charge bias from the high voltage source (not shown) to the surface of photosensitive drum 71 to charge the surface uniformly. Next, LED head 50 facing the surface of photosensitive drum 71 irradiates the photosensitive drum 71 with a light beam corresponding to the image data, forming an electrostatic latent image on the irradiated part where the potential has decreased by light attenuation.

Development device 74 attaches toner to the electrostatic latent image formed on the surface of photosensitive drum 71, and thereby develops a toner image.

The toner image on the surface of photosensitive drum 71 is transferred to sheet P by transfer roller 81 to which a predetermined transfer bias is applied by the high voltage source (not shown).

Thereafter, sheet P is conveyed to fixation unit 90 including heat roller 91 and backup roller 92. Sheet P having the toner image thereon is conveyed to the pressure contact area formed by backup roller 92 and heat roller 91 which is controlled by the temperature controller (not shown) and maintained at a predetermined surface temperature. With the toner fused by the heat from the heat roller 91 and pressed at the pressure contact area, the toner image is fixed onto sheet P.

Sheet P having the toner image fixed thereon is gripped and conveyed by discharge rollers 64 and 65 to be discharged to discharged media stacker 66. With that, the image formation process ends.

Toner may slightly remain on the surface of photosensitive drum 71 after the toner image is transferred. Such residual toner is removed by cleaner blade 73. As described earlier, cleaner blade 73 is disposed in contact with the surface of photosensitive drum 71 at its predetermined area. Toner remaining on the surface of photosensitive drum 71 after transfer is removed by cleaner blade 73 when photosensitive drum 71 rotates about its rotation axis with cleaner blade 73 in contact with the surface of photosensitive drum 71. Photosensitive drum 71 thus cleaned is used repeatedly in subsequent image formation processes.

Next, operation of LED head 50 is described using drawings such as FIGS. 3, 10, and 11. When the exposure device drive controller (not shown) of printer 100 outputs a control signal for LED head 50 based on image data, LED elements 30 emit light in given amounts. The light beams from LED elements 30 enter lens array 1, and are focused on photosensitive drum 71.

In FIG. 10, light beams emitted from LED element 30 near the optical axis of lens surface 12 travels as denoted by R1, R2, and R3. R4 denotes a light beam emitted from LED element 30 away from the optical axis. A light beam from LED array 300 enters lens surface 12, forming an inverted, minified image of LED array 300 at a position which is substantially the midpoint between lens surface 11 and lens surface 17. The light beam from LED array 300 further enters lens surface 16, forming an inverted, magnified image of the inverted, minified image of LED array 300 at an image formed position. In other words, lens array 1 forms an erected, original-sized image at the image formed position on the surface of photosensitive drum 71. In FIG. 11, a light beam emitted by LED element 30 travel as depicted by R1, R2, and R3.

In this embodiment, first lens plate 10 and second lens plate 15 are manufactured using ZEONEX (registered trademark) E48R (by ZEON CORPORATION), which is cycloolefin resin. This material has a refractive index of 1.5247 with respect to the wavelength of LED element 30, which is 770 nm.

Light shield plate 21 and mask 23 are manufactured using TARFLON (registered trademark) GZK3100 (by Idemitsu Kosan Co., Ltd.). Table 1 gives the dimensions of the members used in this embodiment.

TABLE 1

| Member | Part | Item | Example |
| --- | --- | --- | --- |
| lens plate | thickness | LT | 1.3 mm |
|  | surface gap | LG | 2.2 |
|  | lens surface 11, 16 | PX | 1.2 |
|  |  | PY | 0.4 |
|  | mask 23 side | RL | 0.75 |
|  | light shield plate 21 side | RL | 0.6 |
| mask | thickness | MT | 1 |
|  | surface gap | LFM | 1.9 |
|  | opening 24 | RA1 | 0.35 |
|  |  | RA2 | 0.6 |
| light block plate | thickness | ST | 1 |
|  | surface gap | LFS | 1.1 |
|  | opening 22 | RA3 | 0.45 |
|  |  | RA4 | 0.48 |

Next, the shapes of the lens surfaces are described. Each lens surface is a rotationally aspherical surface, expressed by the radius of curvature and coefficients of asphericity of the fourth-order, sixth-order, and the eighth-order (Table 2).

TABLE 2

| Lens Surface | Item | Example |
|---|---|---|
| lens surface 12 (16) (the mask 23 and photoconductive drum 71 side) | radius of curvature | 0.8286 |
| | fourth-order asphericity coefficient | −0.2900 |
| | sixth-order asphericity coefficient | 0.3148 |
| | eighth-order asphericity coefficient | −0.7411 |
| lens surface 11 (17) (the light shield plate 21 side) | radius of curvature | 1.1656 |
| | fourth-order asphericity coefficient | −0.4768 |
| | sixth-order asphericity coefficient | −0.2648 |
| | eighth-order asphericity coefficient | −0.5710 |

In this embodiment, lens surfaces 12 have the same shape as lens surfaces 16, shaped exactly like lens surfaces 16 when rotated 180° about a predetermined rotation axis extending in their array direction. Similarly, lens surfaces 11 have the same shape as lens surfaces 17, shaped exactly like lens surfaces 17 when rotated 180° about a predetermined rotation axis extending in their array direction.

Figure 14:
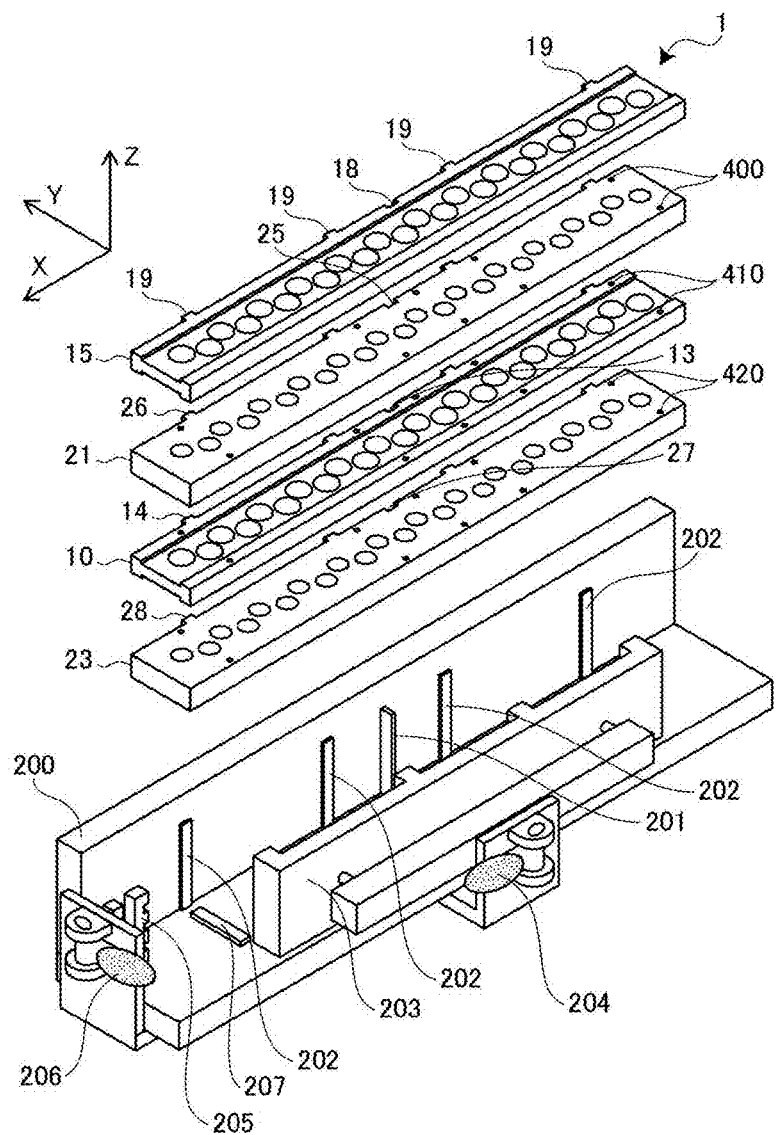
FIG. 14 is a diagram illustrating an assembly jig.

Next, using FIGS. 14 to 17, a description is given of assembly jig 200 used for assembling lens array 1. To clarify the configuration of assembly jig 200, FIG. 14 includes an exploded perspective view of lens array 1. In FIG. 14, the optical axis of each lens surface in first lens plate 10 and second lens plate 15 extends in the Z direction (vertical direction) in FIG. 14.

Lens array 1 has mask 23, first lens plate 10, light shield plate 21, and second lens plate 15 stacked in this order from down to up in FIG. 14. Note that the X direction and the Y direction in FIG. 14 are pointed towards the opposite directions from those in FIG. 6.

X positioning portion 27 of mask 23, X positioning portion 13 of first lens plate 10, X positioning portion 25 of light shield plate 21, and X positioning portion 18 of second lens plate 15 are brought into abutment with X abutment portion 201. The contact surfaces between X abutment portion 201 and X positioning portions 27, 13, 25, and 18 are aligned with one another and are thus substantially flush in the same plane. Y positioning portions 28 of mask 23, Y positioning portions 14 of first lens plate 10, Y positioning portions 26 of light shield plate 21, and Y positioning portions 19 of second lens plate 15 are brought into abutment with corresponding Y abutment portions 202. The contact surfaces between Y abutment portion 202 and Y positioning portions 28, 14, 26, and 19 are aligned with one another and are thus substantially flush in the same plane. Mask 23 is brought into abutment with Z abutment portions 207, so that the height position of mask 23 (the position in the Z direction in FIG. 14) can be accurately set relative to the other members of lens array 1. Since Z abutment portions 207 are provided at multiple locations on a flat surface, lens array 1 can be assembled with favorable straightness of mask 23 achieved.

The X abutment portion, the Y abutment portions, and the Z abutment portions of assembly jig 200 are formed so that their straightness (flatness) and the relation between segments of each portion (a step) have an accuracy of 0.005 mm or below.

At five locations of light shield plate 21 in the longitudinal direction thereof, a total of ten indented portions 400 are formed. Similarly, first lens plate 10 has a total of ten indented portions 410, and mask 23 has a total of ten indented portions 420. Indented portions 400, 410, and 420 are used to fix the members of lens array 1 together with adhesive 37, at the five locations in the longitudinal direction near the respective positioning portions.

Figure 15:
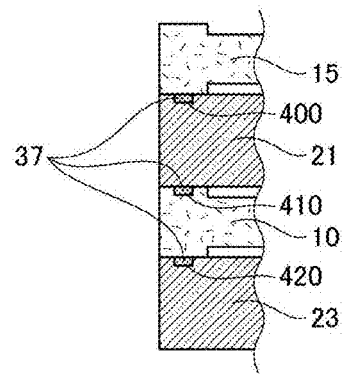
FIG. 15 is a sectional view of the stacked members of the lens array, depicting an area near indented portions.

As depicted in a sectional view of an area near the indented portions in FIG. 15, the members of lens array 1 are stacked with adhesive 37 applied to the indented portions 400, 410, and 420. Adhesive 37 hardens when time passes with the members put in position by assembly jig 200. Mask 23, first lens plate 10, light shield plate 21, and second lens plate 15 can thus be fixed to each other with high accuracy.

Figure 16:
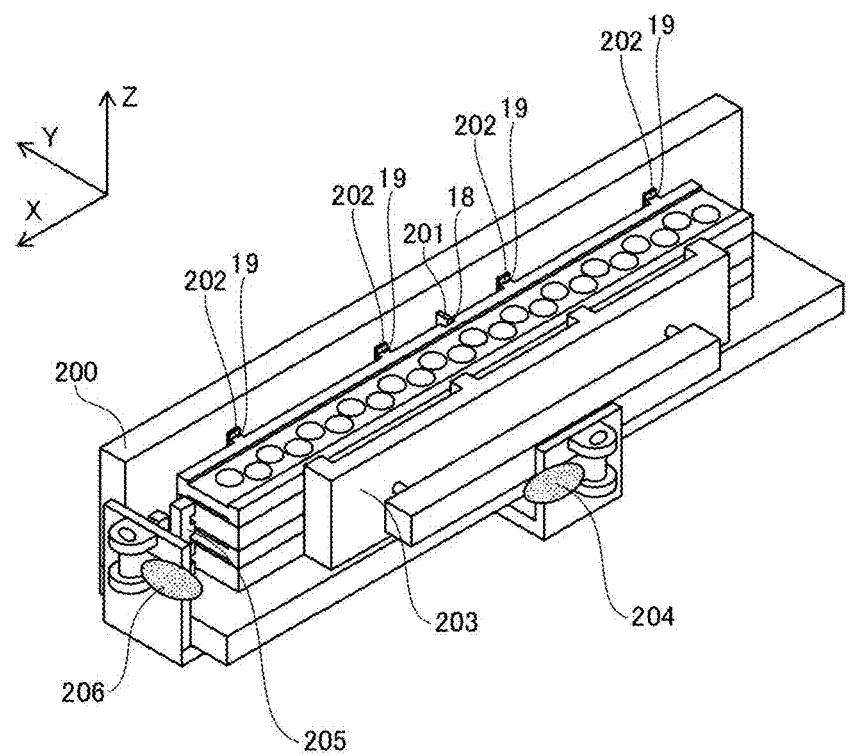
FIG. 16 is a diagram illustrating the lens array set in the assembly jig.

As illustrated in FIG. 16, when lever 206 is operated in assemblage of lens array 1, X press portion 205 is pressed against lens array 1 in the X direction in FIG. 16 by a crank mechanism, bringing X abutment portion 201 into abutment with X positioning portions 27, 13, 25, and 18. When lever 204 is operated in assemblage of lens array 1, Y press portion 203 is pressed against lens array 1 in the Y direction in FIG. 16 by a crank mechanism, bringing each Y abutment portion 202 into abutment with corresponding Y positioning portions 28, 14, 26, and 19.

Figure 17:
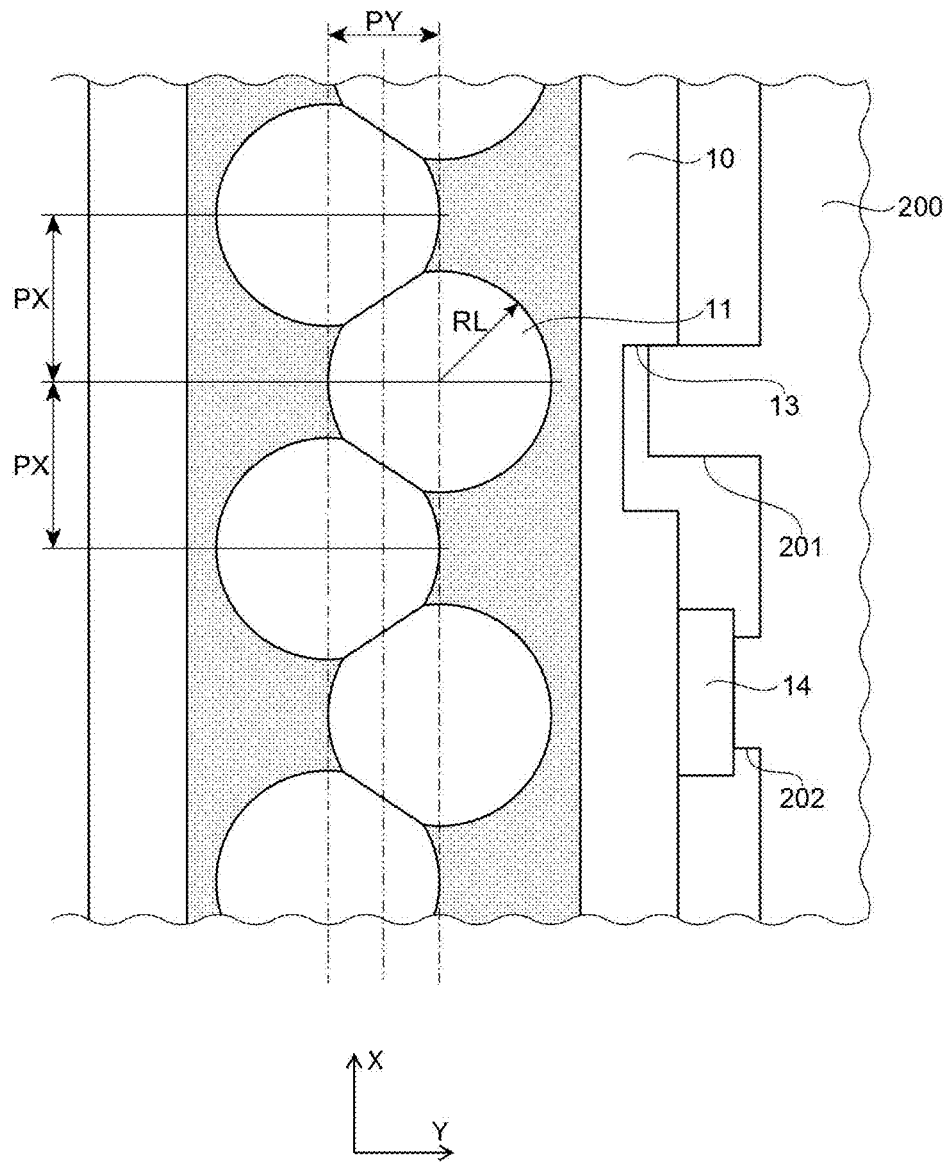
FIG. 17 is a diagram illustrating how an X abutment portion is pressed against the X positioning portion and how an Y abutment portion is pressed against the Y positioning portion.

FIG. 17 is a diagram illustrating how X abutment portion 201 is pressed against X positioning portion 13 (27, 25, and 18) and how Y abutment portion 202 is pressed against Y positioning portion 14 (28, 26, and 19). In the following description, the X direction (vertical direction) in FIG. 17 extends in the longitudinal direction of first lens plate 10 and second lens plate 15.

As depicted in FIG. 17, when lever 206 for X press portion 205 is operated, X abutment portion 201 is brought into abutment with X positioning portions 27, 13, 25, and 18. When lever 204 for Y press portion 203 is operated, Y abutment portion 202 is brought into abutment with Y positioning portions 28, 14, 26, and 19.

Use of such assembly jig 200 enables lens array 1 of the embodiment to be assembled with the following accuracy.

Displacement between first lens plate 10 and second lens plate 15 in the X direction: −0.015 mm to +0.015 mm Displacement between first lens plate 10 and second lens plate 15 in the Y direction: −0.04 mm to +0.04 mm Displacement between second lens plate 15 and light shield plate 21 in the X direction: −0.025 mm to +0.025 mm Displacement between second lens plate 15 and light shield plate 21 in the Y direction: −0.07 mm to +0.07 mm Displacement between first lens plate 10 and mask 23 in the X direction: −0.04 mm to +0.04 mm Displacement between first lens plate 10 and mask 23 in the Y direction: −0.05 mm to +0.05 mm As described earlier, Z abutment portions 207 are formed on the bottom surface of assembly jig 200 at locations along its longitudinal direction, serving as references to achieve straightness (warpage) of lens array 1 in the Z direction.

Adhesive 37 is set with a book jig (not shown) with a flat face being placed on second lens plate 15 of the stacked members. Lens array 1 can thus be assembled with its straightness in the Z direction having an accuracy of −0.05 mm to +0.05 mm.

The assembly accuracy is measured using a measuring microscope, with the longitudinal direction of lens array 1 being the X direction and the direction orthogonal to both the longitudinal direction and the optical axis direction of each lens surface being the Y direction.

An image formed on the surface of photosensitive drum 71 by LED head 50 using lens array 1 has sufficient contrast, with very little variances in light amount. Printer 100 having lens array 1 can produce a favorable print result without an unwanted line or uneven concentration.

As described, the members of the lens array can be assembled with high accuracy even when the size of the lens array is reduced in parts other than the lens surfaces that light beams enter, and therefore the lens array can be downsized. Further, the image formation apparatus can produce a favorable print result without an unwanted line or uneven concentration.

Second Embodiment

Figure 18:
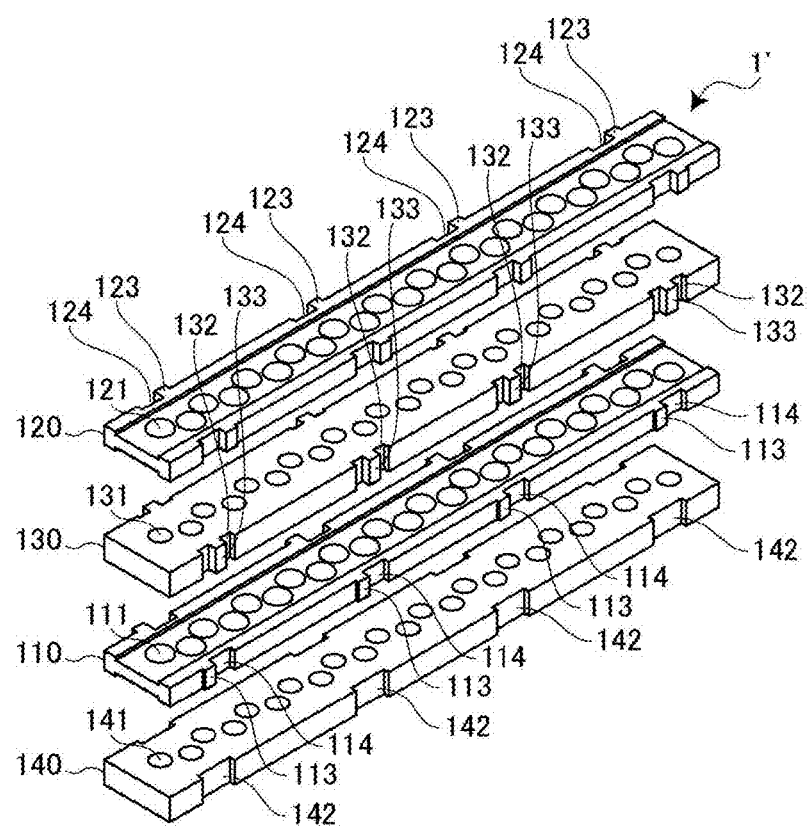
FIG. 18 is an exploded perspective view illustrating the configuration of a lens array according to a second embodiment.

FIG. 18 is an exploded perspective view of lens array 1' according to a second embodiment. In lens array 1' according to this embodiment, third lens plate 110, which forms an inverted, minified image based on light emitted by LED elements 30, is oriented so that the optical axis of each lens surface 111 of the third lens plate 110 extends in the Z direction (vertical direction) in FIG. 18. Light block plate 130 is provided between third lens plate 110 and fourth lens plate 120, which inverts and magnifies the inverted, minified image formed by third lens plate 110 to form an inverted, magnified image of the inverted, minified image. Mask 140 is provided between LED elements 30 and third lens plate 110. Third lens plate 110 has two arrays of lens surfaces 111, which are formed on one sides of the respective lenses. Fourth lens plate 120 has two arrays of lens surfaces 121 formed on one surfaces of the respective lenses.

Light block plate 130 has two arrays of opening portions 131, and mask 140 has two arrays of opening portions 141. Opening portions 131 and opening portions 141 are arranged at substantially the same intervals so that the optical axes of lens surfaces 111 and 121 may align with each other.

Third lens plate 110 has Z positioning portions 113 (third positioning portions) and slits 114 formed on longitudinal side surfaces thereof, at locations spaced apart at predetermined intervals. Z positioning portions 113 and slits 114 are formed on each of the end portions of third lens plate 110 facing in the Y direction in FIG. 18, which is orthogonal to both the longitudinal direction of third lens plate 110 and the optical axis direction of each lens surface 111. Slits 114 are formed at the same locations as Z positioning portions 113 in terms of the longitudinal direction of lens array 1'. Similarly, fourth lens plate 120 has Z positioning portions 123 (third positioning portions) and slits 124 formed on longitudinal side surfaces thereof, at locations spaced apart at predetermined intervals. Z positioning portions 123 and slits 124 are formed on each of the end portions of fourth lens plate 120 facing in the Y direction in FIG. 18, which is orthogonal to both the longitudinal direction of fourth lens plate 120 and the optical axis direction of each lens surface 121. Slits 124 are formed at the same locations as Z positioning portions 123 in terms of the longitudinal direction of lens array 1'.

Light block plate 130 has Z positioning portions 133 and slits 132 formed on longitudinal side surfaces thereof, at locations spaced apart at predetermined intervals. Z positioning portions 133 and slits 132 are formed on each of the end portions of light block plate 130 facing in the Y direction in FIG. 18, which is orthogonal to both the longitudinal direction of light block plate 130 and the axial direction of each opening portion 131. Slits 132 are formed at the same locations as Z positioning portions 133 in terms of the longitudinal direction of lens array 1'.

Mask 140 has slits 142 on longitudinal side surfaces thereof, at locations spaced apart at predetermined intervals. Slits 142 are formed at the same locations as Z positioning portions 113, 123, and 133 in terms of the longitudinal direction of lens array 1'.

Figure 19:
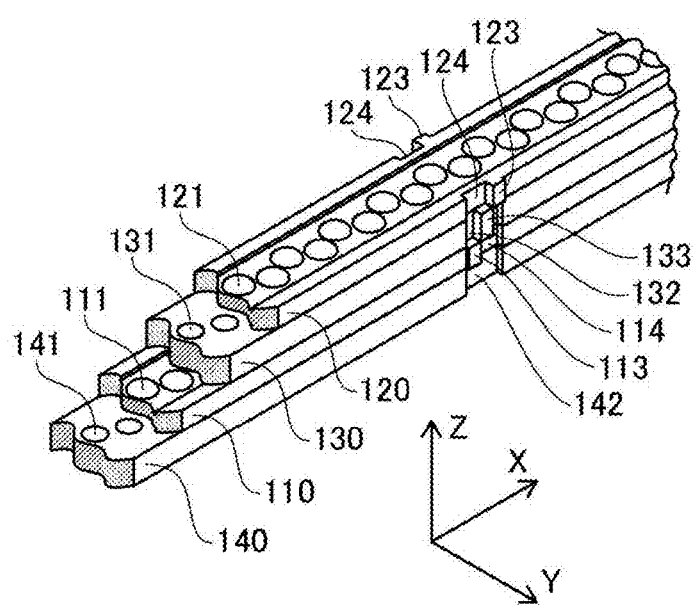
FIG. 19 is a diagram illustrating Z positioning portions.

Next, using FIG. 19, a description is given of the Z positioning portions depicted in FIG. 18. As in the example illustrated in FIG. 7, lens array 1' is oriented so that the optical axis of each lens surface in third lens plate 110 and fourth lens plate 120 may extend in the Z direction (vertical direction) in FIG. 19. In lens array 1', mask 140, third lens plate 110, light block plate 130, and fourth lens plate 120 are stacked in this order from down to up. In this state, slits 124, 132, and 142 are at the same locations as Z positioning portion 113 in terms of the longitudinal direction of lens array 1', so as to be located above and below Z positioning portion 113. Meanwhile, slits 124, 114, and 142 are at the same locations as Z positioning portion 133 in terms of the longitudinal direction of lens array 1', so as to be located above and below Z positioning portion 133.

Figure 20:
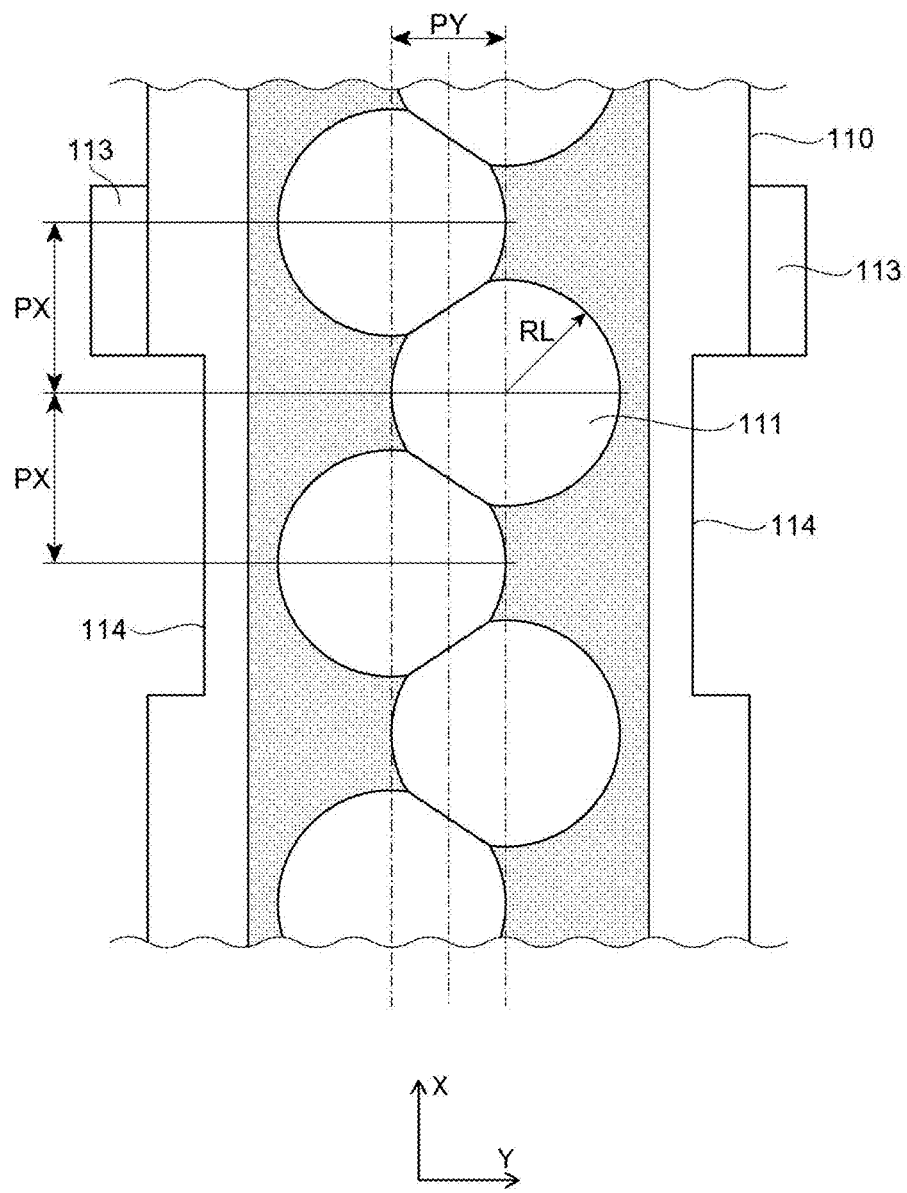
FIG. 20 is a diagram illustrating the shape of a third lens plate and a fourth lens plate.

Next, using FIG. 20, the shapes of third lens plate 110 and fourth lens plate 120 are described. Since third lens plate 110 and fourth lens plate 120 have substantially the same shape, only the shape of third lens plate 110 is described herein. The following description assumes that the vertical direction (the X direction) in FIG. 20 is the longitudinal direction of third lens plate 110.

Third lens plate 110 has two arrays of lens surfaces 111 formed on one sides of the respective lenses. When PX is the array interval between adjacent lens surfaces 111, the array interval in one array of lens surfaces 111 is 2×PX. PY denotes the array interval between adjacent lens surface 111 in the horizontal direction (the Y direction) in FIG. 20. Z positioning portions 113 protrude from the end portions facing in the horizontal direction (the Y direction) in FIG. 20. Slits 114 are indented from the end portions facing in the horizontal direction (the Y direction) in FIG. 20. Z positioning portions 113 are formed integrally with third lens plate 110.

Figure 21:
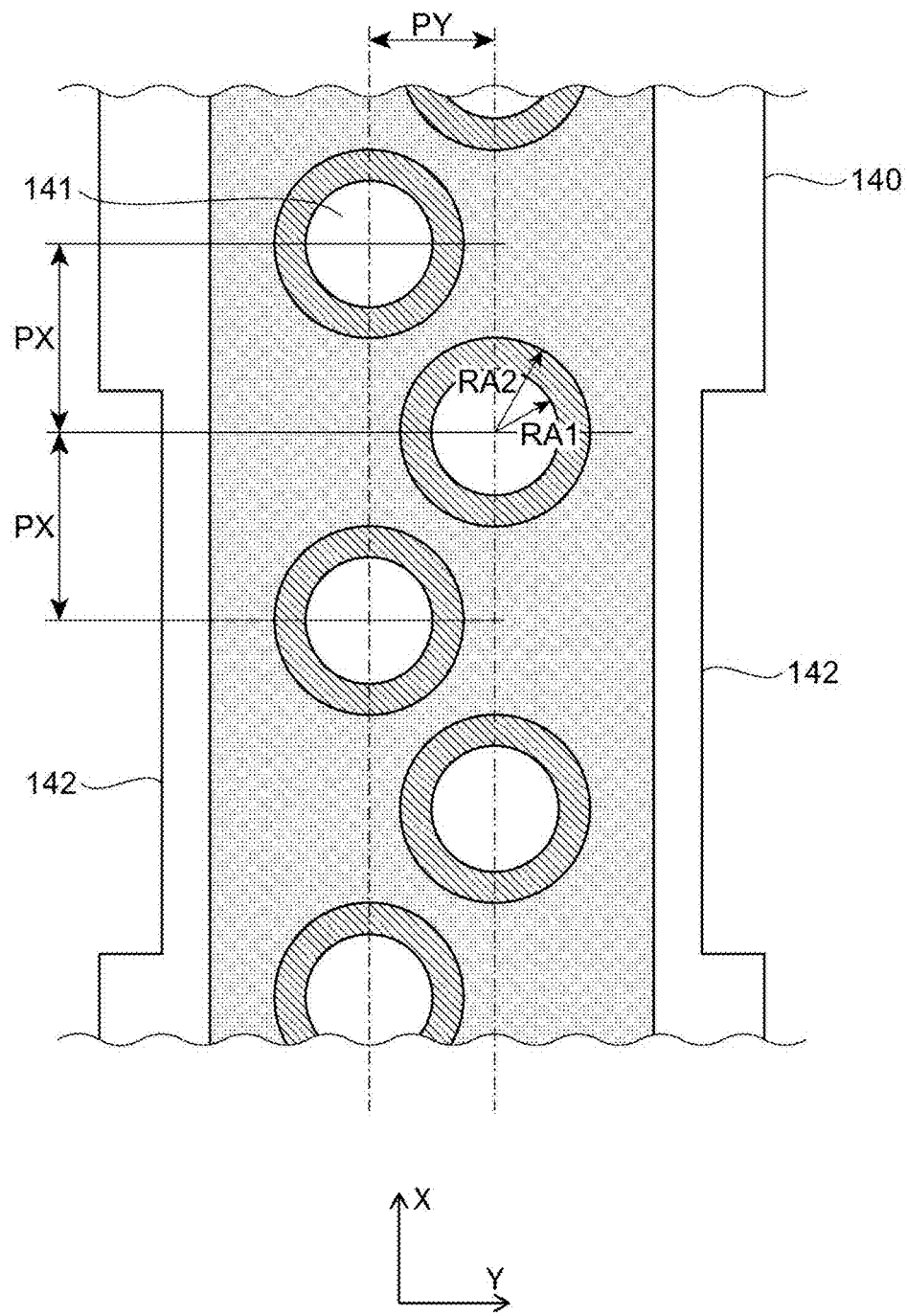
FIG. 21 is a diagram illustrating the shape of a mask.

Next, the shape of mask 140 is described using FIG. 21. The following description assumes that the X direction (vertical direction) in FIG. 21 extends in the longitudinal direction of mask 140. FIG. 21 depicts the surface of mask 140 that faces third lens plate 110, illustrating the shape of mask 140 as viewed from the third lens plate 110 side. Mask 140 has two arrays of opening portions 141. When PX is the array interval between adjacent opening portions 141, the array interval in one array is 2×PX. PY denotes the array interval between adjacent opening portions 141 in the Y direction (horizontal direction) in FIG. 21. Opening portions 141 are circular. The opening diameter of each opening portion 141 is set to RA1 on the surface facing LED array 300 and to RA2 on the surface facing third lens plate 110. Opening diameter RA1 is smaller than opening diameter RA2. Slits 142 are indented from the end portions facing in the Y direction (horizontal direction) in FIG. 21.

Figure 22:
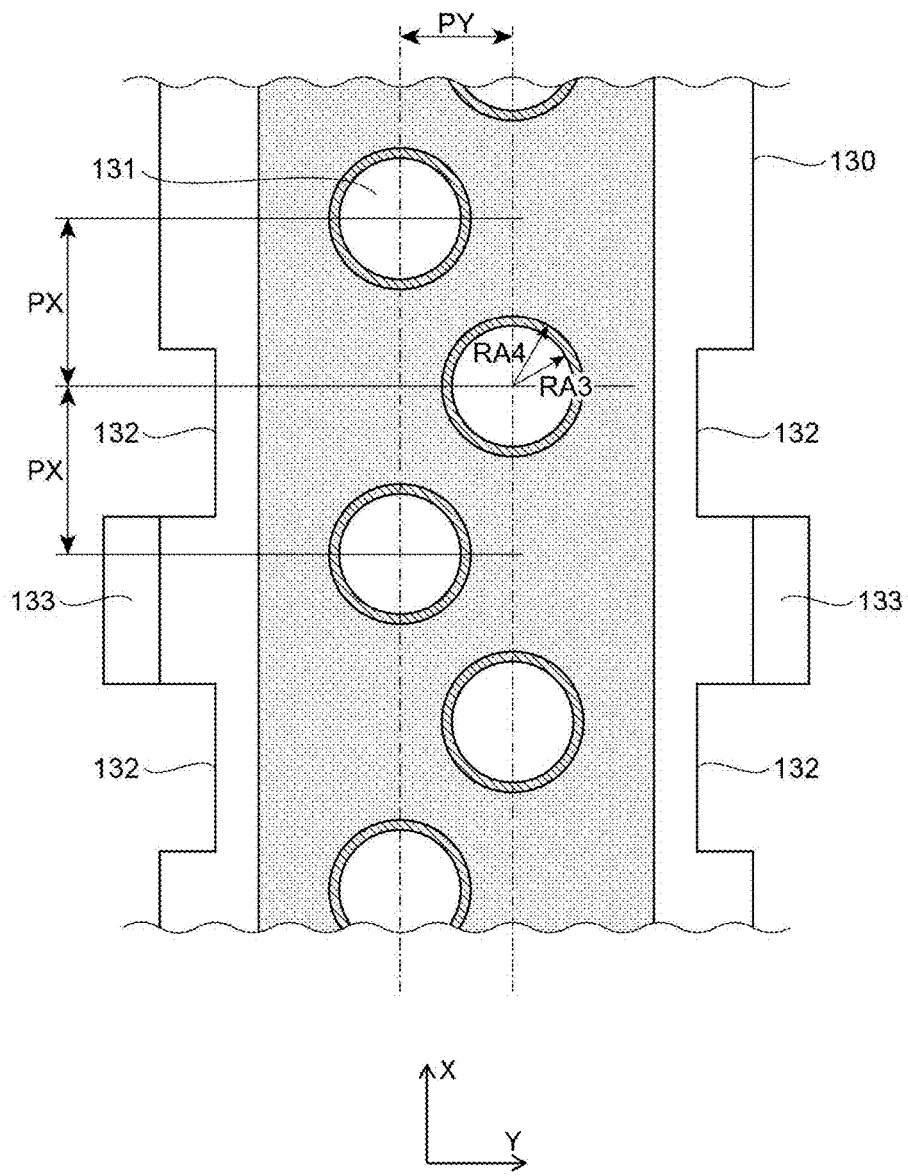
FIG. 22 is a diagram illustrating the shape of a light block plate.

Next, the shape of light block plate 130 is described using FIG. 22. The following description assumes that the X direction (vertical direction) in FIG. 22 extends in the longitudinal direction of light block plate 130. FIG. 22 depicts the surface of light block plate 130 that faces third lens plate 110, illustrating the shape of light block plate 130 as viewed from the third lens plate 110 side. Light block plate 130 has two arrays of opening portions 131. When PX is the array interval between adjacent opening portions 131, the array interval in one array is 2×PX. PY denotes the array interval between adjacent opening portions 131 in the Y direction (horizontal direction) in FIG. 22. Opening portions 131 are circular. The opening diameter of each opening portion 131 is set to RA3 on the surface facing LED array 300 and to RA4 on the surface facing fourth lens plate 120. Opening diameter RA3 is smaller than opening diameter RA4. Z positioning portions 133 protrude from the end portions facing in the horizontal direction (the Y direction)

in FIG. 22. Slits 132 are indented from the end portions in the horizontal direction (the Y direction) in FIG. 22. Z positioning portions 133 are formed integrally with light block plate 130.

Figure 23:
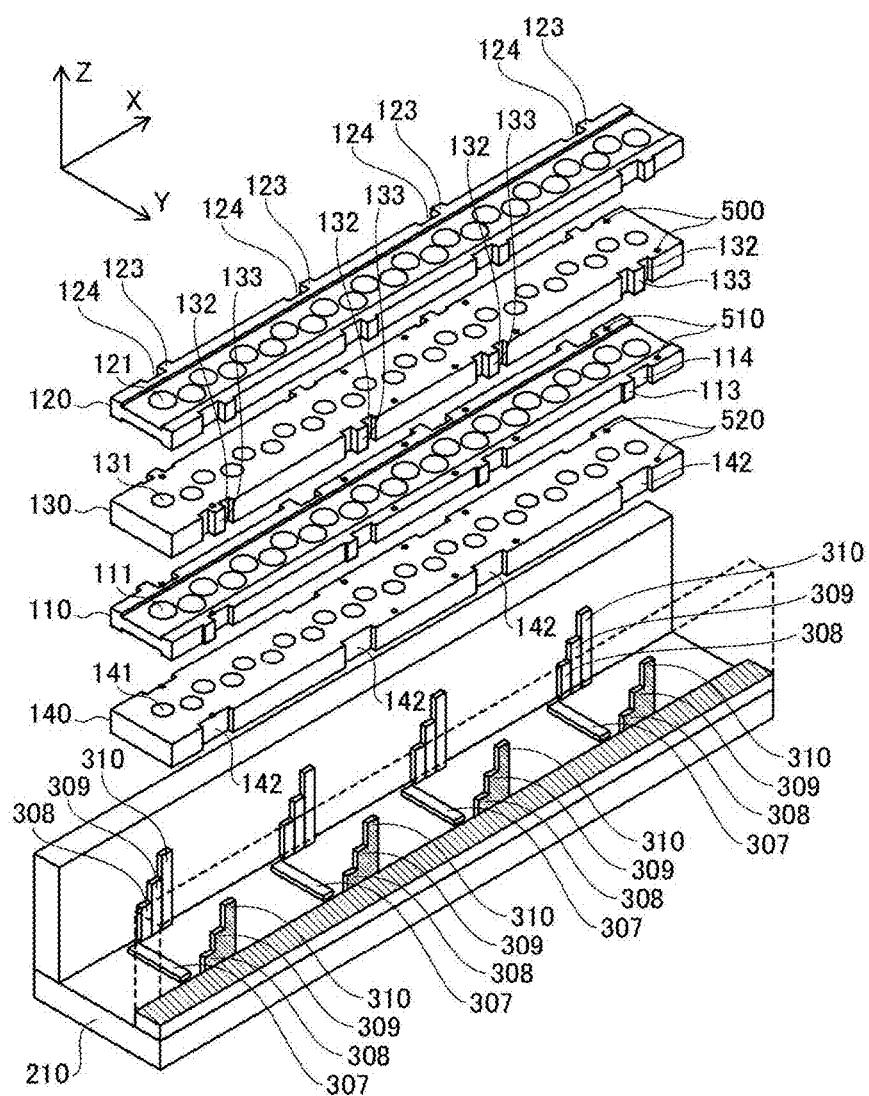
FIG. 23 is a diagram illustrating an assembly jig.

Next, using FIG. 23, a description is given of assembly jig 210 used for assembling lens array 1'. To clarify the configuration of assembly jig 210, FIG. 23 includes an exploded perspective view of lens array 1'. In FIG. 23, the optical axis of each lens surface in third lens plate 110 and fourth lens plate 120 extends along the Z direction (vertical direction) in FIG. 23.

Lens array 1' has mask 140, third lens plate 110, light block plate 130, and fourth lens plate 120 stacked in this order from down to up in FIG. 23.

Mask 140 is brought into abutment with Z abutment portions 307, so that the height position of mask 23 (the position in the Z direction in FIG. 23) can be accurately set relative to the other members of lens array 1'. Since Z abutment portions 307 are provided at multiple locations on a flat surface, lens array 1' can be assembled with favorable straightness of mask 140 achieved.

Z positioning portions 113 of third lens plate 110 are brought into abutment with Z abutment portions 308, so that the height position of third lens plate 110 (the position in the Z direction in FIG. 23) can be accurately set relative to the other members of lens array 1'. Since Z abutment portions 308 are provided at multiple locations on a flat surface, lens array 1' can be assembled with favorable straightness of third lens plate 110 achieved.

Z positioning portions 133 of light block plate 130 are brought into abutment with Z abutment portions 309, so that the height position of light block plate 130 (the position in the Z direction in FIG. 23) can be accurately set relative to the other members of lens array 1'. Since Z abutment portions 309 are provided at multiple locations on a flat surface, lens array 1' can be assembled with favorable straightness of light block plate 130 achieved.

Z positioning portions 123 of fourth lens plate 120 are brought into abutment with Z abutment portions 310, so that the height position of fourth lens plate 120 (the position in the Z direction in FIG. 23) can be accurately set relative to the other members of lens array 1'. Since Z abutment portions 310 are provided at multiple locations on a flat surface, lens array 1' can be assembled with favorable straightness of fourth lens plate 120 achieved.

In addition, slits 114, 124, 132, and 142 allow the Z abutment portions to be brought into contact with the Z positioning portions.

In assembly jig 210, the Z abutment portions are formed so that their straightness (flatness) and the relation between segments of each portion (a step) have an accuracy of 0.005 mm or below.

At five areas of light block plate 130 in the longitudinal direction thereof, a total of ten indented portions 500 are formed. Similarly, third lens plate 110 has a total of ten indented portions 510, and mask 140 has a total of ten indented portions 520. Indented portions 500, 510, and 520 are used to fix the corresponding members of lens array 1' together with adhesive 37, at the five locations in the longitudinal direction near the respective positioning portions.

Figure 24:
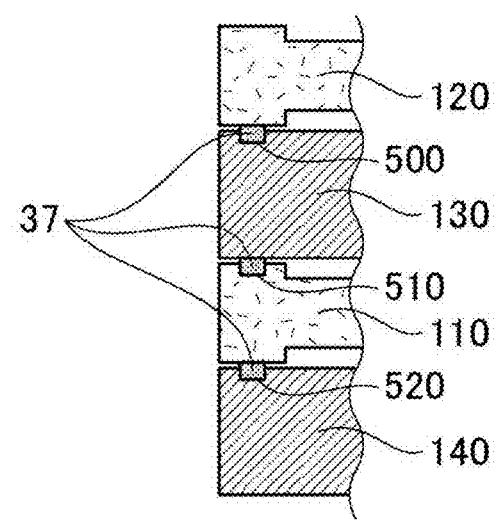
FIG. 24 is a sectional view of the stacked members of the lens array, depicting an area near indented portions.

As depicted in a sectional view of an area near the indented portions in FIG. 24, the members of lens array 1' are stacked with adhesive 37 applied to the indented portions 500, 510, and 520. Adhesive 37 hardens when time passes with the members put in position by assembly jig 210. Mask 140, third lens plate 110, light block plate 130, and fourth lens plate 120 can thus be fixed to each other with high accuracy.

Lens array 1' can be assembled with its members having accurate straightness and accurate height (positions in the Z direction in FIG. 23) by being pressed down from above in FIG. 23 after the members of lens array 1' are set in assembly jig 210.

The lens array can be assembled with the gap between the two lens plates in the Z direction, the gap between the light block plate and each lens plate in the Z direction, and the gap between the mask and its adjacent lens plate and in the Z direction having an accuracy of −0.01 mm to +0.015 mm from calculated values.

This embodiment not only achieves the advantageous effects produced by the first embodiment, but also enables the lens array to be assembled with its members accurately set in terms of their height positions relative to one another, with high straightness.

Although the invention is applied to an optical system in an image formation apparatus in the above description of the invention, the invention is also applicable to an imaging optical system in a multifunctional machine with facsimile and/or scanning capability, by replacing the LED elements with sensors.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A method of manufacturing a lens unit comprising:
preparing a lens plate member including a plurality of lenses arranged in a first direction; and a light block member including a plurality of opening portions arranged in the first direction and provided in one-to-one correspondence with the lenses, wherein a first positioning portion is formed at a first position in the first direction of each of the lens plate member and the light block member such that, in a state in which the lens plate member and the light block member are stacked together, the first positioning portion of the lens plate member and the first positioning portion of the light block member continuously extend in a second direction along an optical axis direction of the lenses, and wherein the lens plate member includes a plurality of second positioning portions arranged in the first direction and the light block member includes a plurality of second positioning portions arranged in the first direction, such that in the state where the lens plate member and the light block member are stacked together, the second positioning portions of the lens plate member and the second positioning portions of the light block member continuously extend in the second direction; and
stacking the lens plate member and the light block member by applying adhesive between the lens plate member and the light block member and using an assembly jig including a first abutment portion contacting the first positioning portions and second abutment portions contacting the second positioning portions, such that the first positioning portions contact the first abutment portion of the assembly jig to position the lens plate member with respect to the light block member in the first direction and the second positioning portions contact the second abutment portions of the assembly jig to position the lens plate member with respect to the light block member in a third direction orthogonal to the first direction and the second direction.

2. The method according to claim 1, further comprising hardening the adhesive between the lens plate member and the light block member of the stack to fix the lens plate member and the light block member to each other.

3. The method according to claim 1, wherein each of the lens plate member and the light block member includes a plurality of third positioning portions arranged in the first direction, and the assembly jig includes third abutment portions contacting the third positioning portions, such that the third portioning portions contact the third abutment portions of the assembly jig to position the lens plate member with respect to the light block member in the second direction.

4. The method according to claim 3, wherein the plurality of third positioning portions of the lens plate member comprise a same height in the second direction.

5. The method according to claim 3, wherein the plurality of third positioning portions of the light block member comprise a same height in the second direction.

* * * * *